United States Patent

[11] 3,591,023

| [72] | Inventor | Rudolph Allen<br>4561 Lake Washington Blvd., Kirkland,<br>Wash. 98033 |
|---|---|---|
| [21] | Appl. No. | 795,266 |
| [22] | Filed | Jan. 30, 1969 |
| [45] | Patented | July 6, 1971 |

[54] MECHANICALLY PROGRAMMABLE MARINE TRANSPORT CARGO HANDLING AND STOWAGE SYSTEM
29 Claims, 16 Drawing Figs.

[52] U.S. Cl. .................................................... 214/14,
214/15, 214/16.4
[51] Int. Cl. ........................................................ B65g 63/04
[50] Field of Search ......................................... 214/12, 14,
15, 16; 114/72, 43.5; 61/67

[56] References Cited
UNITED STATES PATENTS

| 1,298,499 | 3/1919 | Hansen | 214/14 |
| 1,903,274 | 3/1933 | Watson | 214/16.14 A UX |
| 2,363,797 | 11/1944 | Lovfald | 114/72 |
| 2,637,453 | 5/1953 | Cleveland | 214/15 |
| 2,715,969 | 8/1955 | Olsen | 214/15 |
| 2,894,650 | 7/1959 | Black et al. | 214/14 X |
| 2,916,168 | 12/1959 | Coursey | 214/16.1 (4 E) |
| 3,165,211 | 1/1965 | Ablett et al. | 214/15 |
| 3,318,276 | 5/1967 | Nemec | 114/72 X |
| 3,411,169 | 11/1968 | Guerke | 114/43.5 X |
| 3,460,686 | 8/1969 | Cole | 214/152 X |

FOREIGN PATENTS

| 953,530 | 3/1964 | Great Britain | 214/15 |

*Primary Examiner*—Gerald M. Forlenza
*Assistant Examiner*—Frank E. Werner
*Attorney*—Christensen, Sanborn & Matthews

ABSTRACT: The disclosed system is applicable to towed or powered cargo vessels. Central to one of its three distinct cargo handling phases, the system features an open staging deck on the vessel to and from which cargo is moved by way of a ramp that can be lowered directly to the beach. Practical vessel design and ramp length permitting the vessel to remain afloat during such cargo transfers are achievable with special beach grades, variable ballasting of the vessel and adjustable slope of its loading ramp. Sidewise cargo transfer at a dock is also permitted, as are transship transfer operations by the same vessel. Central to a second of the three cargo-handling phases is an overarching three-directional crane-moving individual cargo units successively between the staging deck and elongated cargo stowage cells. The cells are arranged in tiers and extend longitudinally of the vessel with entrance ends preferably in a common vertical crane transfer plane adjacent to the staging deck. The cargo cells have individual conveyors, which function in the third of the three cargo-handling phases to move the inserted cargo units between successive stowed positions along the cells and crane transfer position at the cell entrances. With the total sequence of handling operations thus divided into these three phases and programmed large numbers of cargo units may be loaded and unloaded in a short time. Moreover rearranging of cargo units within or between cells while en route for convenience in subsequent transfer operations between the vessel and the shore or for transshipping is also readily achieved. Also disclosed are cargo unit shuttle conveyors featuring line-controlled cam bar mechanisms driven and controlled from the cell ends through lines to raise, lower and move individual cargo units in the cell.

3,591,023

MECHANICALLY PROGRAMMABLE MARINE TRANSPORT CARGO HANDLING AND STOWAGE SYSTEM

DESCRIPTION

This invention relates to improvements in marine cargo transport vessels and more particularly to systems therein for loading, unloading, stowing and rearranging of cargo in the stowage space of the vessel. The invention is herein illustratively described by reference to the preferred embodiment thereof; however, it will be recognized that certain modifications and changes therein with respect to details may be made without departing from the essential features involved.

Railroad car barges, truck van carriers, unitized containers, palletized unit cargo systems, and various other techniques have been developed out of prior efforts to improve the competitive position of maritime shipping. However, most of these systems and the vessels using them have had limited versatility and required the dock facilities of a major port. It was therefore necessary to rely upon smaller vessels, airplanes, or overland shipping, with attendant higher costs of handling, in order to reach smaller ports or wayside points.

It is an important object of this invention to provide a versatile, efficient, low-cost maritime general freight transportation system by which service may be rendered to these smaller ports and shipping points as well as to the larger ones. More especially, it is an object to provide a system which does not require a dock or elaborate shoreside facility as a requirement for direct landing, loading and unloading of the vessel, yet which lends itself to use in vessels of major size and capacity designed efficiently to serve large ports as well. Specifically, the invention provides a transport vessel and cargo-handling system which requires only an accessible beach to land, unload and load cargo and which can perform its cargo transfer function with sufficient speed and efficiency that even a large vessel moving between major ports can make waypoint minor pickups and deliveries economically.

Apart from the landing requirement limitation of prior transport vessels precluding direct service to small ports and lesser shipping points, protracted loading and unloading time seriously limited the versatility and economic efficiency of prior systems. An object hereof is to provide improved loading and unloading facilities and arrangements for marine transport vessels not only greatly reducing layover time, but also more fully mechanizing, improving the safety and reducing the labor in taking on, lashing and unloading cargo. In this same regard, a further important object hereof is to devise a transport vessel with onboard cargo-staging area, conveyor means, and handling facilities so as to permit shuffling of cargo while en route. As a result expensive layovers at ports of call for the purpose of cargo rearranging, usually requiring extensive use of dockside facilities, may now largely be eliminated. Hence, the same transport vessel serving major ports may also function efficiently as a "milk run" carrier providing benefits of low-cost, direct intercoastal shipping to numerous smaller ports and shipping points.

A related object hereof is to provide such a system usable with barge-type vessels as well as with more conventional or larger ships.

A further object is to provide a fully mechanized and self-contained system for loading, unloading and handling of cargo to the end that the vessel will be self-sufficient with a relatively small crew.

A further object is a mechanized and programmable loading, stowage and unloading system of the described nature, and one particularly suited for ease of implementing or revising cargo arrangement in relation to seaworthy load distribution and port of call sequence.

A vessel designed and equipped to practice this invention divides cargo handling into three distinct phases as a basis upon which to achieve greatly increased loading and unloading speeds, programmed control of cargo transfer, and related benefits. In one phase cargo units are transferred over the vessel's ramp between an adjoining staging deck on the vessel and either the beach, a dock, or the deck of another vessel. In a second and distinct phase, cargo units are picked up by an onboard three directional crane and moved between the staging deck and the transfer end of one of a number of elongated stowage cells extending lengthwise of the vessel. In the third phase of handling, cargo in a cell is moved by a cell conveyor between its transfer end and a stowage position along the cell. Handling speed is then maximized by sequence programming and operating speed control applied to the mechanized cell conveyors and three-way crane in relation to rate at which cargo units are moved aboard or off the staging deck. Being fully mechanized and lent to program control, conveyor and crane functions may be automated, although subject to override control and program revisions by a human operator who observes cargo movements to and from the vessel.

Other features of the invention reside in the system arrangement wherein the longitudinally extending cargo stowage cells are arranged in successive tiers at different heights in relation to the staging deck and have open cargo transfer (i.e. receiving and discharge) ends preferably lying in a common vertical transfer plane adjacent to the staging deck. The crane preferably overarches the staging deck so as to move its carriage vertically and horizontally in a vertical plane parallel to said transfer plane, and by elevator-type automatic positioning controls, or the like, moves the carriage to and from cargo pickup or discharge positions on the staging deck to positions of registry with selected stowage cells. The crane carriage comprises transfer means for inserting the cell-aligned cargo unit into the cell with which it registers, whereupon conveyor means within the cell engages and moves the cargo unit along the cell to the desired stowed position therein. The same steps are executed in reverse to unload the cell.

The vessel also provides a stowage deck preferably at the level of the staging deck and extending aft therefrom beneath the structure housing overlying tiers of cargo cells. Preferably, this stowage deck includes at least one or more deck-level endless conveyors substantially flush with the staging deck and extending into and comprising a working part of the staging deck area, adding further to the versatility of the system to stow and handle varying types of cargo in differing arrangements.

Additional features reside in the provision of shuttle-type conveyor means for the individual stowage cells permitting single cargo units to be shifted between stowage position and crane-cell transfer position at the cell's entrance without necessity for moving other cargo units currently occupying the same cell. Drive means at the cell ends control and operate the shuttle carriages through connecting lines so as to raise, transport and lower the individual cargo units in relation to cargo unit stationary supports extending lengthwise in the cells.

In accordance with other important aspects of this invention, direct beach landings to take on and discharge cargo by vehicles moved over the vessel's ramp are made possible without necessity of beaching or grounding the vessel nor of employing oddly specialized or inefficiently shaped hulls, nor of requiring a ramp length too great to be managed conveniently aboard the vessel. Specifically it is found that this objective can be attained, if (a) the beach above an intermediate tide elevation, surfaced to support vehicle traffic and to resist wave erosion, is sloped to a grade of substantially 14½ percent and to a steeper grade at lower elevation (b) the ramp length on a barge-type vessel a few hundred feet in length is of the order of 50 feet (it need not be longer), and (c) the vessel is variably ballasted to control freeboard and trim angle fore and aft. While endwise loading over the ramp to the staging deck is usually employed, sidewise loading to the ramp or staging deck when at dockside is also contemplated. Transfers to and from other vessels may also be effected in either manner. Dock-mounted ramps or conveyors, or other-vessel ramps or conveyors may also be used to serve the subject vessel's staging deck, as best suits particular conditions. It is possible for the loading ramp on the subject vessel to comprise part of the staging deck or to increase the effective area of the staging deck.

These and other features, objects and advantages of the invention will become more fully evident from the following description thereof by reference to the accompanying drawings.

In FIGS. 1 to 4, inclusive, the invention is depicted as being applied to a planing hull vessel or barge 10 which may be either towed or self-propelled. The hull stem $10a$ typically has a shallow slope angle of approximately 25°. This stem angle and the somewhat shallower angles (approximately 15°) of the chines at the bow portion of the vessel are selected to strike a balance between retaining maximum bow-end capacity or displacement and a stem contour enabling the vessel to make the closest bow approach feasible to the beach while remaining afloat. With a shallow stem angle the bow $10b$, at deck level, projects shoreward to a substantial degree so as to increase the reach of the landing ramp 12, pivotally supported on transversely aligned pivots $12a$ thereon. Raised and lowered by winch 14 through cables 16, ramp 12 may be swung vertically through an angular range between upraised, stowed positions shown by broken lines in FIG. 2, to any of different forwardly extending landing positions as depicted wherein it rests upon the beach above water level; alternatively upon a dock or the deck of another vessel.

In areas like Alaska having extreme tidal variations ranging more than 25 feet, beach landings to discharge and take on cargo directly require a unique combination of system features if the vessel hull is to be of normal efficient size and design and the ramp is to be of manageable length. To this end, it is found that beach grade above an intermediate tide elevation, such as plus 13 feet in an area where tide ranges upward to 26 feet or so, should be substantially 14½ percent. Below this intermediate elevation beach grade should be steeper, usually twice as steep. Secondly, ballast tanks are provided fore and aft, preferably also at port and starboard, so as to permit controlling list and trim angles. These tanks are designated $10c1$ $10c2$, $10c3$ and $10c4$ in FIG. 4A. Each is served by a flooding pump 20 and a discharge pump 18. Thirdly a variable-height elongated bow ramp is provided typically of the order of 50 feet in length. Accordingly dry beach landings with the vessel remaining afloat may then be made safely and efficiently at all tide levels. Variations in vessel load, weight distribution, and tide level dictate choice of ramp slope and hull trim, through amount and distribution of ballast, in order to minimize discontinuity at the junctures between the barge and the ramp and between the ramp and the beach. For example, at low tide level such as the negative 4 feet shown in FIG. 4, the vessel may be caused to float higher by removal of ballast particularly from bow compartments $10c3$ and $10c4$, so as to raise the base end of the ramp nearer the elevation level at which it contacts the beach and, if need be, reduce the angle of jog between ramp and deck. At extreme high tides elimination of all ballast in the bow tanks accompanied by addition of ballast in the stern tanks thereby to raise the bow in order to avoid grounding at the bow when the ramp is landed, enables the system to operate effectively in waters like those off Alaska. At normal high tide, such as plus 20 feet shown in FIG. 4, equal light ballasting in bow and stern tanks would be effective. Underway, of course, ballast is light and is distributed only to correct for list and trim abnormalities.

In its upraised position the ramp forms an end closure complemental to side bulwarks 22 so as to shelter the decks against the seas.

Figure 1:
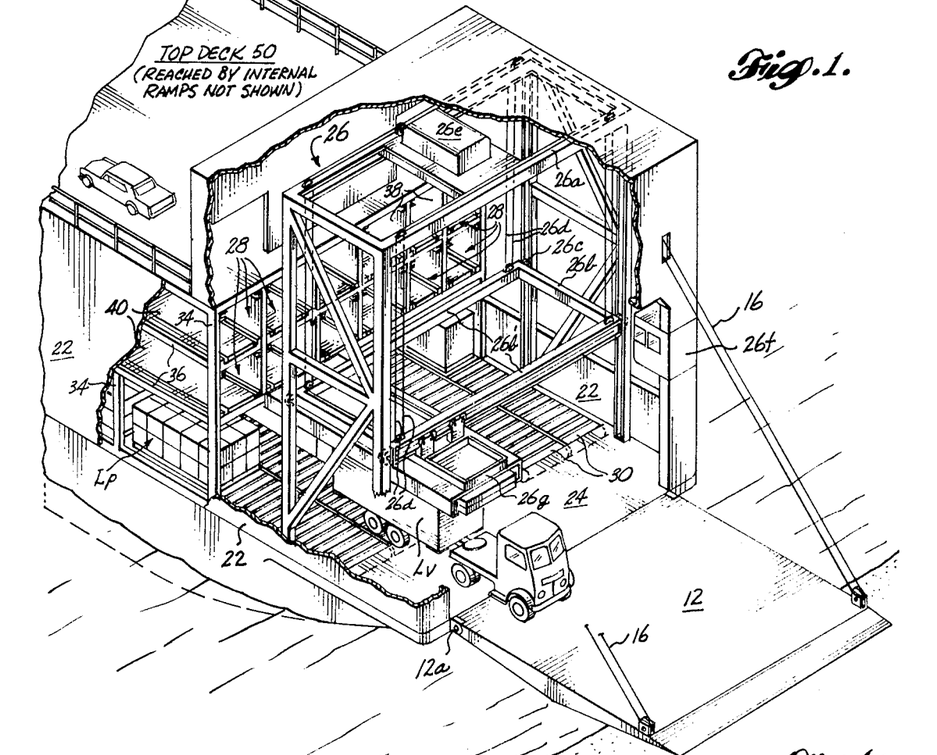
FIG. 1 is an isometric view of the forward end portion of a barge vessel incorporation the invention.

Adjoining the ramp and accessible by way of the ramp is a staging deck 24 spanning the width of the vessel and extending aft from the bow a suitable distance so as to serve as a staging area for the crane and for vehicles moving cargo to and from the vessel over the ramp. This staging deck is open, with clearance high enough above deck level, and is wide enough and long enough to accommodate trucks with vans, as depicted in FIG. 1, as well as to hold a number of cargo units such a palletized loads $L_p$ or containers or vans $L_v$ for storage and shipment or in the process of loading, unloading or shuffling of cargo units while en route. For maximum efficiency and speed in loading and unloading a typical barge of this invention ramp width is made approximately 40 feet so as to accommodate four lines of truck traffic, and deck width is somewhat wider, such as 50 to 60 feet in a barge 300 to 400 feet in length.

Figure 2:
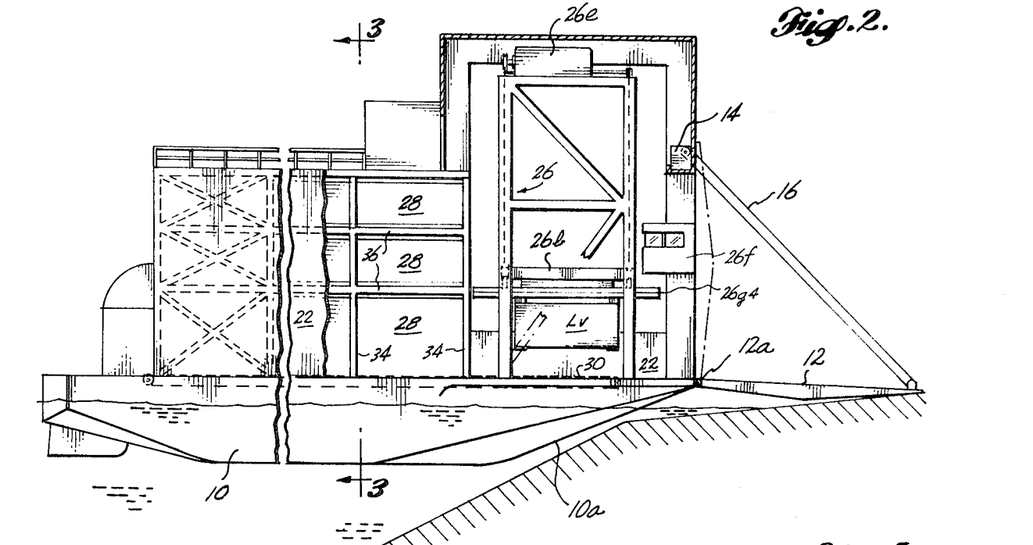
FIG. 2 is a somewhat simplified side elevation of the same barge vessel at somewhat smaller scale, with parts broken away for convenience in illustration.
Figures 3, 4A:
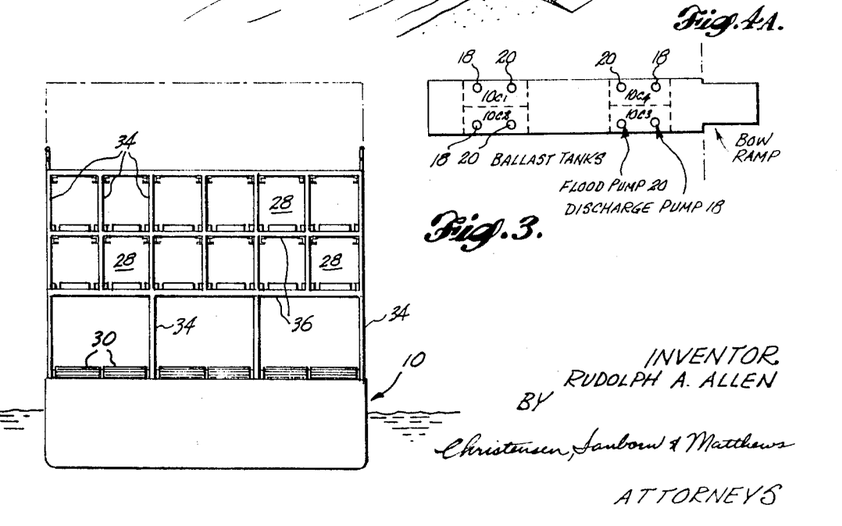
FIG. 3 is a further simplified transverse sectional view taken on line 3-3 in FIG. 2.
FIG. 4a is a simplified plan view of the hull outline showing separate ballast tanks in all four quarters as a means to control list and trim fore and aft.
Figure 4:
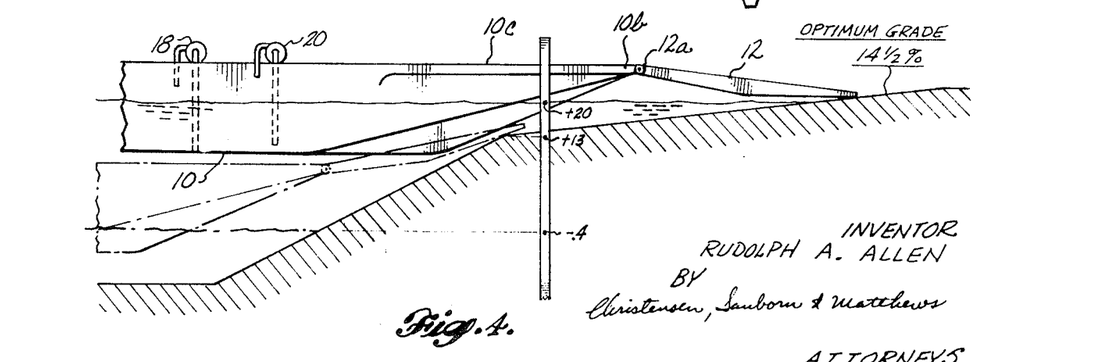
FIG. 4 is a schematic side elevation of the forward end of the barge hull and ramp depicting hull and ramp proportioning, variable ballasting of the vessel for accommodating the same to tide stage and beach grade in typical loading and unloading applications.

Staging deck 24 is overarched and served by a three-way crane 26 and at its aft margin is confronted by the adjoining ends of a plurality of elongated cargo stowage cells 28 opening forwardly into the region overlying the staging deck so as to be served by the crane. Arranged in tiers, cells 28 extend longitudinally of the vessel, preferably over most of its remaining length as indicated in FIG. 2. As shown, the lowermost tier of cell spaces is made flush with the staging deck 24, and in this case each has a cargo support floor comprising the upper stretch of an elongated endless horizontally disposed conveyor 30 of the chain or belt-type. Preferably the conveyors 30 extend out into and form part of the staging deck area 24 such that cargo units may be deposited directly thereon. Trucks and other vehicles may be driven directly onto these conveyors. The cells 28 in higher tiers are accessible only by way of the crane 26 in the illustrated case. For convenience in design of the crane structure and controls for effecting transfer of cargo units to and from these cells by the crane 26, it is preferred that the cell ends adjacent the staging deck lie substantially in the same transverse vertical plane parallel with the crane standards to be described. The cells are formed and supported by any suitable framing structure comprising columns 34 and beams 36 as well as other suitable elements the details of which are of no direct importance herein. The cells are usually separated by divider walls 38 and provided with floors 40 for access convenience of the crew and to support various types of cargo units.

Above the uppermost tier of cells is a top cargo deck 50 which may be wholly or partly covered and may serve to stow the bulkier and more weather-resistant mobile items such as automobiles, house trailers, boats, and similar articles. It may be reached by way of a separate ramp (not shown) sloping down to the staging deck or adjoining cargo storage deck, or may be served by way of the crane 26. If desired, this upper deck may also be used as a passenger and observation deck or in other capacities.

Figure 8:
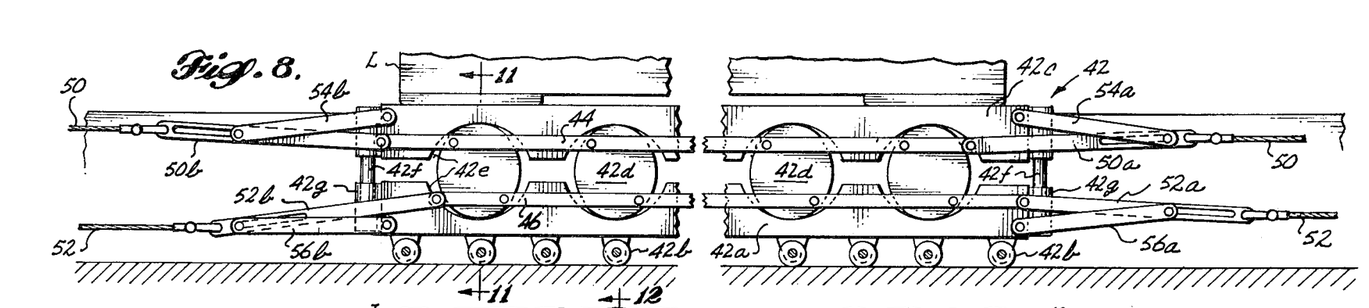
FIGS. 8 and 9 are related enlarged side elevation views of one side section of such a cargo transfer shuttle system shown respectively in the cargo-elevated and cargo-lowered position of its jacking platform.
Figure 9:
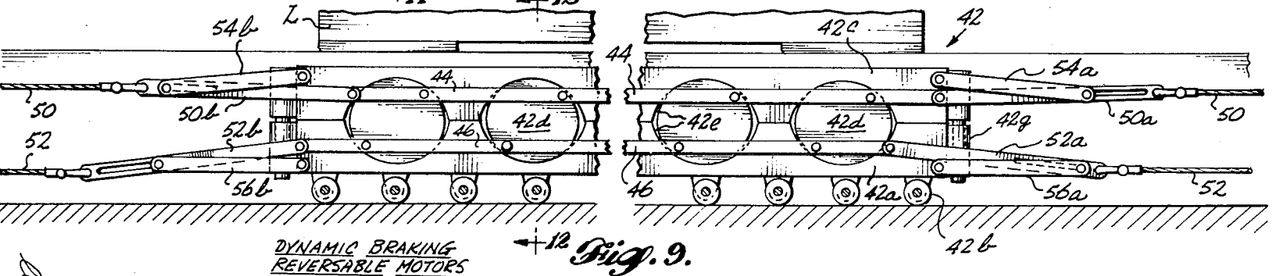
Figure 10:
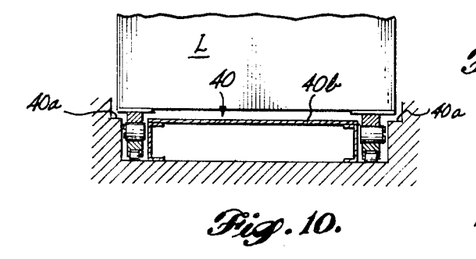
FIG. 10 is a transverse sectional view taken on line 10-10 in FIG. 6 showing a cargo unit lifted by the shuttle platform and ready to be moved along the cell.
Figure 11:
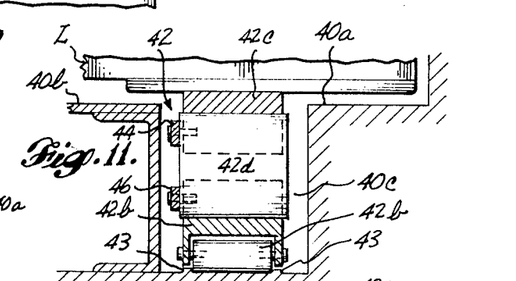
FIGS. 11 and 12 are enlarged views of one side section of the structure shown in FIG. 10, and illustrating the raised and lowered positions of a cargo unit and its means of support in the cell.
Figure 12:
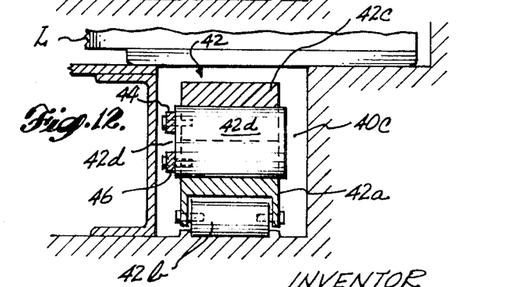

Upon insertion of a cargo unit within a cell, the cargo unit is first deposited by the crane on the cell floor 40. In the example the cell floor consists of load-bearing ledges 40a extending along opposite sides of the cell, and a bridging filler section 40b flush with the side ledges and separated from the ledges by respective spaces forming grooves 40c. These grooves accommodate the respective side sections of conjointly operable conveyor shuttles 42 and their associated control lines. Each conveyor shuttle section comprises a base platform 42a riding on rollers 42b (which track between floor guides 43 extending lengthwise of the cells), and a cargo-supporting jacking platform or bar 42c resting on a series of rotary, oval, cylindrical cams 42d. The cams are socketed in mating recesses 42e formed in the mutually opposing surfaces of the platforms. When rotated conjointly to a position with their major axes horizontal (FIGS. 9 and 12), the cams permit the jacking platform to drop onto the base platform so as to deposit a cargo unit L onto the cell floor 40. However, when the cams are rotated conjointly to a position with their major axes vertical, the cams 42d elevate the jacking platform and thereby the cargo unit to a position where it clears the floor (FIGS. 8, 10 and 11) and is ready for being moved along the cell.

A longitudinally extending connecting rod 44 is pivotally connected to the respective cams at similar eccentric points above center on corresponding cam end faces, and a similar connecting bar 46 is likewise connected to the cams at eccentric points below center on the corresponding cam end faces. These eccentric points are diametrically opposed in relation to the cam axes. The arrangement is such that longitudinal reciprocation of the bars 44 and 46 in alternately opposite directions rotate the cams back and forth through a range of 90° in order to raise and lower the jacking platform 42c. To shift the bars 44 and 46, the ends of these bars are respectively connected to the drive cables 50 and 52 through sets of links 50a, 50b; and 52a, 52b. longitudinal slots are formed in these links engaged by stop pins in the ends of respectively associated links 54a, 54b; and 56a, 56b. As viewed in FIG. 8, if the upper connecting bar 44 is drawn endwise to the right by pulling on link 50a while bar 46 is drawn endwise to the left by pulling on link 52b, the jacking platform will be lowered to the position shown in FIG. 9. This position is established by bottoming of the link pin and slot elements against each other so as to prevent further rotation of the cylindrical cams in the same direction. At this point the shuttle may be withdrawn from beneath the deposited cargo unit so as to be moved to a new position. Conversely, pulling endwise (to the left in FIG. 8) on bar 44 through link 50b while simultaneously pulling endwise (to the right) on bar 46 through link 52a will rotate the cams through 90° to the opposite stopping point and elevate the jacking platform 42c so as to lift the overlying cargo unit L off the cell floor. Continued pulling on link 50b to the left will move the shuttle (hence the cargo unit) to the left. At this time drag tension in link 52a is being maintained so as to assure that the jacking platform will not drop by bodily acceleration of the shuttle. Consequently, continued pulling on link 52a while maintaining drag tension in link 50b will effect movement of the loaded shuttle to the right, as viewed in FIG. 8. Guide rods 42f and associated sleeves 42g on the jacking platform and base platform maintain the platforms in vertical alignment while permitting the jacking platform to move up and down.

Figure 7:
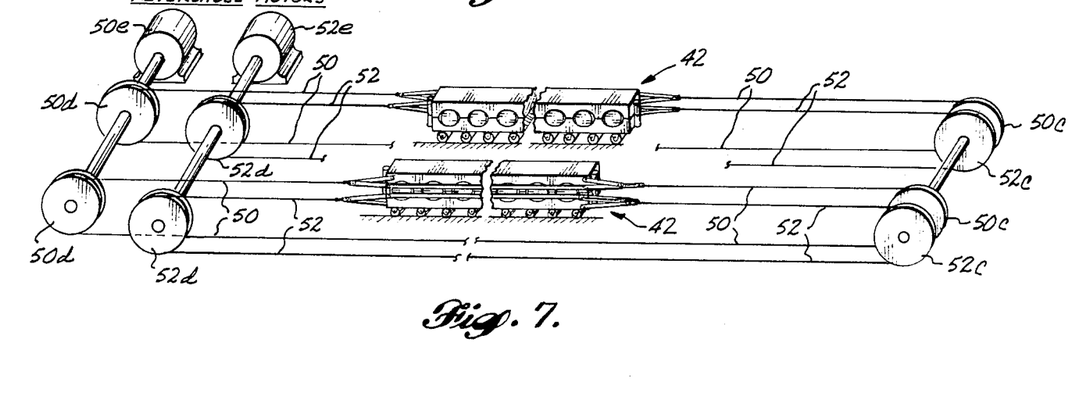
FIG. 7 is a simplified schematic isometric view of a cargo transfer shuttle and related drive means incorporated in one cargo cell of the vessel.

In order to actuate and move the shuttle elements, sets of control cables 50 and 52 are provided, guided and driven at the cell ends. With its ends fastened to links 50a and 50b, cable 50 is guided around sheave 50c and drum 50d at the respective cell ends. Cable 52 is similarly fastened and guided, employing sheave 52c and drum 52d. The cables enwrap drums 50d and 52d at least a few turns in order to provide driving and braking traction. These drums are selectively driven by reversible motors 50e and 52e designed to impose dynamic braking or drag on their driving shafts when not energized to be driven positively. Other braking devices may also be used if desired in order to maintain drag tension in the appropriate cables when a cargo unit is being shifted lengthwise of the cell which it occupies. If desired, chain and sprocket elements may be used in lieu of cables and drums in order to provide driving and braking forces through more positive drive connections.

Figure 13:
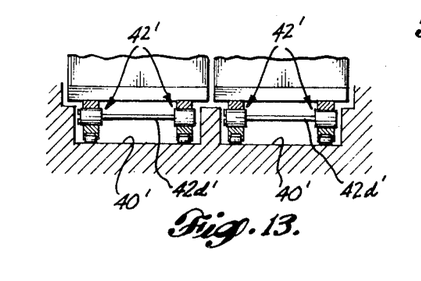
FIG. 13 is a view similar to FIG. 10 showing a cell floor and related transfer shuttle system in a modified form.

In FIG. 13 a modified floor and cell-partitioning arrangement is employed. The cells are associated in pairs, and the floor 40' of each cell is recessed across the full width of the cell and with the shuttle side sections or elements 42' having their corresponding oval, cylindrical cams rotationally interconnected by shafts 42d' as shown. These shafts eliminate the need for a second set of control and drive cables as depicted in FIG. 7, inasmuch as the shuttle sections on both sides of the cell will operate conjointly by means of the shafts.

Three-directional crane 26 comprises an overarching structure 26a. Within the corner uprights or standards of this structure, a horizontal rectangular frame 26b is guided on rollers 26c to be moved up and down on cables 26d which extend around suitable guide sheaves to a winch mechanism 26e mounted at any suitable position such as on top of the crane structure under control of an operator who is conveniently located within a control house 26f. Appropriate crane winch controls of suitable or conventional types used in elevators or other lift systems are employed which require no particular illustration or description herein. Frame 26b has elongated sides 26b' which extend transversely of the vessel so as to serve as carriage rails that span across the width of the staging deck 24. Crane carriage 26g rides on roller 26g1 on these tracks driven by suitable winch and cable mechanism (not shown). Thus the crane carriage can be moved up and down and crosswise of the vessel into any desired position so as to register with any selected cargo stowage cell, registry being selected by the crane operator who sets the crane controls for particular cells or transfer positions and the final positioning being automated through use of any conventional or suitable building elevator positioning systems.

The crane carriage further comprises a base platform 26g2 suspended by sets of rollers 26g3 on transversely spaced tracks 26g4 which extend lengthwise of the vessel over the staging deck to a point terminating just short of the plane P representing the common plane of termination of the adjacent open ends of the cargo cells. Tracks 26g4 line up with short sections of tracks 26g5 fixed in the cells along the respective upper opposite sides thereof such that the rollers 26g3 of the carriage may move from the carriage tracks 26g4 to the cell tracks 26g5 and back. A lift platform 26g6 suspended under base platform 26g2 can be raised and lowered from the latter by means of mechanical or hydraulic jacks 26g7 under control of the crane operator. The lift platform has lift connectors 26g8 also controlled by the crane operator and which are of any suitable or conventional design releasably engageable with the top fittings on standardized cargo container of van $L_v$ so as to lift the cargo unit $L_v$ from the staging deck when the frame 26b is lifted to seek the desired cargo cell tier level. Once the cargo unit is in registry with the cell, the crane operator or an automatic control causes the carriage shuttle 26g3, 26g2, 26g6 to be advanced by suitable or conventional winch and cable mechanism (not shown) into the cell and thereupon operates the jacks 26g7 so as to lower the unit to the cell floor. The operator or automatic controller then releases the couplings 26g8 to disengage the unit and retracts the carriage to return the same to a position overlying the staging deck to be moved to a different cell or back to the deck for picking up another cargo unit. The sequence may be practiced in reverse, of course, in order to remove cargo units during unloading and shuffling operations. Cargo lashing in the cells is unnecessary.

The carriage is long enough to accommodate the longest standardized cargo vans (40 feet at present) or other units but by incorporating intermediate sets of lift connectors, or being of adjustable length, may pick up shorter cargo units of standardized length. To pick up sling loads a conventional or suitable bridle may be fastened in obvious manner to the carriage lift platform. In some vessels provision will also be made for docked cargo transfer wherein the cargo is moved to and from the vessel over one side. If the vessel's own crane does this work the crane structure requires open-sided framing and conventional or suitable provisions to extend and retract the carriage sideways of the vessel in like manner to its extension and retraction longitudinally into the cells. Cranes to lift and move cargo units in any of different directions and through selected ranges by travel are sufficiently well known that these and other variations applicable to the invention require no further description herein. Side loading and discharge to and from the ramp with the vessel at dockside may be carried out by any suitable means including dock equipment, portable conveyors, etc.

In some instances the ramp may itself be used as a staging deck or to serve as part of the staging deck and in that situation appropriate crane design to pick up and deposit cargo units when on the ramp is contemplated using appropriate track extensions or otherwise to extend the reach of the crane in much the same manner as it extends into the cells for transfer of cargo units in relation to the cells, or laterally to a dock as previously mentioned.

Figure 5:
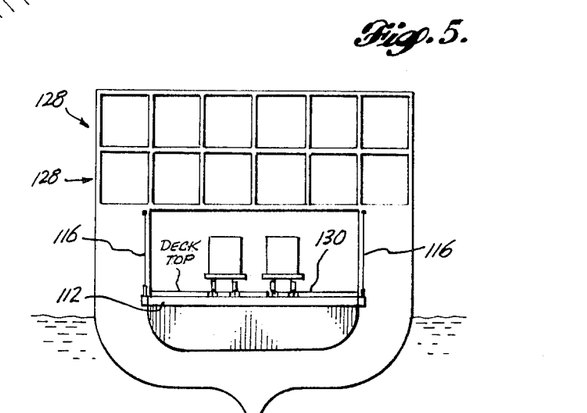
FIG. 5 is a transverse sectional view similar to FIG. 3 applied to a modified vessel, with lower deck railroad trackage therein.
Figure 6:
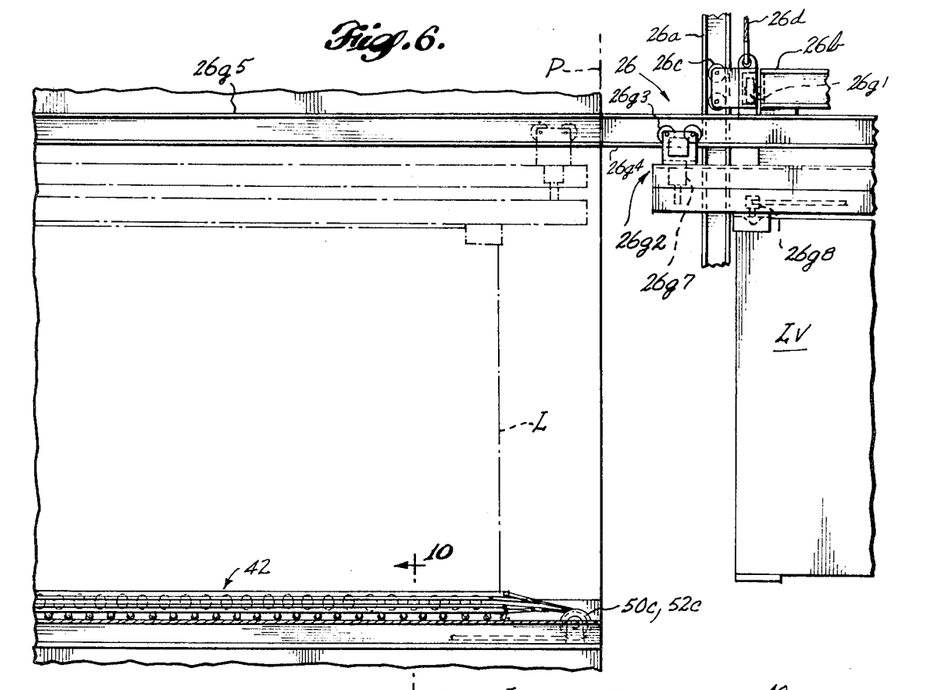
FIG. 6 is an enlarged fragmentary side elevation view of load transfer mechanism comprising the insertion end portion of a cargo cell structure and a related portion of crane mechanism for inserting and removing cargo units into and from the cell.

In FIG. 5 the illustration is intended to depict the potential application of the invention to larger transoceanic vessels of the type having a deeper hull and in which railroad trackage may be provided across the staging deck and onto an adjoining length of stowage deck 130 flush therewith, underlying the tiered sets of cargo unit cells 128. In this example, as well as in the previous one, a loading and unloading ramp 112 may be provided supported by cables 116 and various other details of construction may be designed according to the same principles as those depicted in the intercoastal barge application, as shown in the preceding figures. In some cases an independent ramp on the dock may be used to move the railroad cars to and from the vessel.

Figure 14:
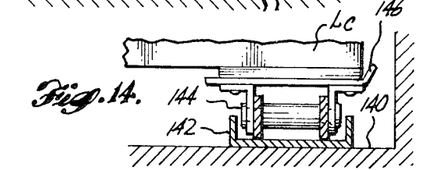
FIGS. 14 and 15 are fragmentary views illustrating still other cargo unit conveyor means to serve individual cells.

In FIGS. 14 and 15 somewhat modified cargo unit conveyors for the respective cells are depicted. In FIG. 14 the cell floor 140 supports an elongated guide channel 142 having upright side flanges serving as a track for an endless chain-type conveyor 144 of any conventional or suitable type which will be coordinated in its motion with a similar conveyor section of the opposite side of the same cell (not shown). A series of pads 146 mounted on the conveyor chain links serve as supports upon which a cargo container unit $L_c$ may rest. In this form of conveyor all of the cargo units within a cell move together along the length of the cell as contrasted with the shuttle-type conveyor described in connection with FIGS. 7, 8 and 9.

Figure 15:
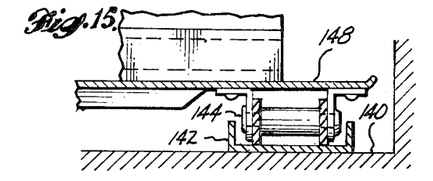

IN FIG. 15 a modification of the endless chain conveyor depicted in FIG. 14 appears. In this instance the same conveyor chain sections 144 are mounted to slide in the guide tracks 142 at opposite sides of the cell, but instead of individual pads 146 associated with the chain links of the respective chains on the opposite sides of the cells, the opposite chains are spanned by supporting platform sections 148 which provide a full width moving platform for the support and shifting of cargo units along the length of a cell, much as the arrangement shown at the lower deck level in the case of conveyors 30 (FIG. 1).

It will be evident that the system of the invention may be practiced in a broad sense with varying designs of cranes and conveyors and with various types of shuttle transfer mechanism for moving the cargo units between the staging deck and the stowage cells. Furthermore, various cell arrangements and types of construction may be employed within the same general principles. With the containers or vans each independently supported on a supporting surface provided by the vessel and confined laterally by the cell sides or bottom ledges the prior customary expenses and delays encountered in lashing and unlashing of all cargo units are avoided. In designing the three operating phase sections or compartments of the system so as to maximize its loading and unloading rate capacity, operating speed of the cell conveyors is related to average handling rate of the crane, and likewise to the average rate at which trucks or other transfer means will normally move cargo units to and from the staging deck. Programmed control of the system, utilizing computer techniques, if desired, may be used to control the order and distribution among cells in which cargo units are inserted in and removed from cells, thereby to enhance the handling speed and minimize layover time in port. Programming input information includes cargo unit weights, acceptable load distribution in the vessel (with or without compensation by ballasting as an additional variable), port of call sequences, and related destinations of individual cargo units. If the desired cargo arrangement is not achieved conveniently upon initially loading the vessel it may be achieved later at a convenient time by shuffling the cargo in or between cells on board, making use of the staging deck, the cell conveyors and the crane to perform this function.

What I claim is:

1. In a marine transport vessel, a cargo-handling and stowage system comprising means providing an open loading and unloading deck on the vessel located remotely from one end thereof, a three-way cargo crane mounted on the vessel to operate over said deck, means adapted for loading and unloading of cargo units on and from said deck, a plurality of elongated cargo storage cells having entrance ends confrontally adjacent to said deck and extending therefrom longitudinally of the vessel toward said one end thereof, certain of said cells being at different levels on the vessel, and cargo unit conveyor means in at least certain of said cells operable to move cargo units lengthwise in the cells to and from successive stored positions therein, said conveyor means being operatively related to the crane so as to permit transfer of cargo units by the crane between said deck and said conveyor means through the respective entrance ends of said cells.

2. The system defined in claim 1, wherein said deck is located at the other end of the vessel and the means for loading and unloading comprises a ramp mounted on said other end of the vessel contiguous to said deck, said ramp being movable between a retracted position with the vessel in transit and a projected position for engaging a landing so as to permit movement of cargo vehicles to and from said deck over said ramp.

3. The system defined in claim 2, wherein the three-way crane comprises a cargo unit-lifting carriage and a carriage-supporting and moving structure, comprising tracks for the carriage, said structure transversely overarching the deck, so as to dispose said tracks across the entrance ends of said cells whereby the carriage may be moved into and from cargo transfer alignment with any of selected cells, and means operatively associated with said carriage to transfer cargo units thereby to and from individual cells.

4. The system defined in claim 3, wherein the end of the vessel carrying the ramp is of shallow-draft form and the ramp projects endwise therefrom to such length as to permit loading and unloading directly on a sloping beach, said ramp being hingedly mounted on the vessel to permit swinging of the ramp about a transverse axis to different selected elevation angles accommodating contour of the beach.

5. The system defined in claim 4, further including means operable to ballast the vessel to vary its trim angle fore and aft.

6. The system defined in claim 4, wherein the cells are arranged in tiers superimposed one over another, each tier comprising a plurality of cells arranged in successively adjacent positions across the vessel.

7. The system defined in claim 3, wherein the conveyor means in at least certain cells comprises an endless conveyor operable to move cargo units in any of such cells conjointly.

8. The system defined in claim 3, wherein the cells have stationary cargo-supporting means extending the length thereof, the conveyor means in at least certain cells comprising a shuttle carriage operable to lift an individual cargo unit from said supporting means and guided to move the lifted cargo unit along the cell between the cell entrance and a selected in-cell storage position spaced therefrom.

9. The system defined in claim 8, wherein the last-mentioned conveyor means comprise actuator lines extending from the shuttle carriage lengthwise of the respective cells to drive means at opposite ends of the cells, and jack elements on such shuttle carriage controlled by such drive means through such lines to first lift a cargo unit, then move it lengthwise of the cell to a selected position, then lower the cargo unit to said supporting means.

10. The system defined in claim 9, wherein the shuttle carriage comprises a base guided to move in a plane lengthwise of the cell, a cargo unit support platform carried by the base and permitted limited elevating movement above the base, and jacking elements controlled by said lines and interposed between the base and support platform to raise and lower such platform.

11. The system defined in claim 10, wherein the lines comprise drive cables, the jacking elements comprise a plurality of rotary-camming devices to which the respective cables are connected at eccentric positions thereon and the drive means comprise powered drums for driving of the cables and for controlling tension therein.

12. The system defined in claim 1, wherein the cells have stationary cargo-supporting means extending the length thereof, the conveyor means in at least certain cells comprising a shuttle carriage operable to lift an individual cargo unit from said supporting means and guided to move the lifted cargo unit along the cell between the cell entrance and a selected in-cell storage position spaced therefrom.

13. The system defined in claim 12, wherein the last-mentioned conveyor means comprise actuator lines extending from the shuttle carriage lengthwise of the respective cells to drive means at opposite ends of the cells, and jack elements on such shuttle carriage controlled by such drive means through such lines to first lift a cargo unit, then move it lengthwise of the cell to a selected position, then lower the cargo unit to said supporting means.

14. The system defined in claim 13, wherein the shuttle carriage comprises a base guided to move in a plane lengthwise of the cell, a cargo unit support platform carried by the base and permitted limited elevating movement above the base, and jacking elements controlled by said lines and interposed between the base and support platform to raise and lower such platform.

15. The system defined in claim 14, wherein the lines comprise drive cables, the jacking elements comprise a plurality of rotary camming devices to which the respective cables are connected at eccentric positions thereon and the drive means comprise powered drums for driving of the cables and for controlling tension therein.

16. The system defined in claim 1, wherein the conveyor means in at least certain cells comprises an endless conveyor operable to move cargo units in any of such cells conjointly.

17. The system defined in claim 3, wherein the crane comprises means to raise and lower the tracks, and wherein the cargo carriage comprises releasable cargo-engaging means engageable with a cargo unit above the bottom thereof to lift the same when the carriage tracks are raised, said cargo-engaging means being extensible longitudinally of the vessel into and from a cell entrance, and including means permitting limited downward movement of the cargo unit thereby for depositing the cargo unit in the cell upon insertion therein.

18. The system defined in claim 17, wherein the cells have parallel longitudinal tracks and the crane carriage has corresponding tracks alignable with the cell tracks and a track-supported car supporting said cargo-engaging means and movable back and forth from one set of tracks to the other for insertion and removal of a cargo unit in a cell.

19. The system defined in claim 1, wherein the three-way crane comprises a cargo unit lifting carriage and a carriage supporting and moving structure, comprising tracks for the carriage, said structure transversely overarching the deck, so as to dispose said tracks across the entrance ends of said cells whereby the carriage may be moved into and from cargo transfer alignment with any of selected cells, and means operatively associated with said carriage to transfer cargo units thereby to and from individual cells.

20. The system defined in claim 19, wherein the crane comprises means to raise and lower the tracks, and wherein the crane carriage comprises releasable cargo-engaging means engageable with a cargo unit above the bottom thereof to lift the same when the tracks are raised, said means being extensible longitudinally from the carriage into and from a cell entrance without moving the tracks longitudinally of the vessel, and including means permitting limited downward movement of the cargo unit thereby without depressing the tracks for depositing the cargo unit in the cell upon insertion therein.

21. The system defined in claim 2, wherein the vessel comprises a cargo storage deck underlying certain of said cells at a level substantially flush with the loading and unloading deck, and comprising at least one elongated cargo unit conveyor means operable to move cargo units lengthwise of the vessel to and from successive stored positions on said storage deck.

22. The system defined in claim 21, wherein the conveyor means last mentioned comprises endless cargo-supporting conveyor means extending from the storage deck at least partially over the length of the loading and unloading deck to form a part thereof.

23. A cargo vessel having a loading ramp hingedly mounted on one end of the vessel with means to raise and lower the ramp to different slope angles, projecting endwise beyond the vessel, said vessel having a hull configuration permitting direct landings over the ramp on tidal beaches having a grade slope of the order of 14½ percent at points above an intermediate tide level and a steeper grade below such level, a plurality of elongated cargo stowage cells each with longitudinal conveyor means therein extending lengthwise of the vessel at different levels therein from respective receiving ends opening toward the ramped end of the vessel, and cargo transfer means positioned on the vessel and operable to transfer cargo units to and from selected cells, the vessel having means thereon affording staging area accessible to said transfer means and upon which cargo units received from the shore or another vessel may be deposited in loading and upon which cargo units may be deposited which are transferred from the cells by said transfer means in unloading of the vessel and in shuffling cargo in and between cells by way of said transfer means.

24. The system defined in claim 23, further including means operable to ballast the vessel so as to vary its trim angle fore and aft.

25. The system defined in claim 23, wherein the cells have stationary cargo-supporting means extending the length thereof, the conveyor means in at least certain cells comprising a shuttle carriage operable to lift an individual cargo unit from said supporting means and guided to move the lifted cargo unit along the cell between the cell entrance and a selected in-cell storage position spaced therefrom.

26. The vessel defined in claim 23, wherein the cargo transfer means comprises a three-way crane including a cargo unit lifting carriage and a carriage supporting and moving structure, comprising tracks for the carriage, said structure transversely overarching the staging area, so as to dispose said tracks across the entrance ends of said cells whereby the carriage may be moved into and from cargo transfer alignment with any of selected cells, and means operatively associated with said carriage to transfer cargo units thereby to and from individual cells.

27. In a beach-landing marine transport system the combination comprising a cargo vessel having independently variable fore and aft ballasting means, a vertically hinged elongated loading ramp at one end over which to move cargo with the ramp beached, means to stow cargo in the vessel including a plurality of longitudinally extending open end storage cells, a deck area adjacent the open sides of the cells, and transfer means to move cargo units between such stowage and a position of transfer on the deck area, said deck area being accessible by movement of vehicles over the ramp.

28. The combination defined in claim 27 including a prepared landing beach negotiable by land transport vehicles, wherein the beach above an intermediate tide level has a grade of approximately 14½ percent and below such level has a materially steeper grade to accommodate the floating vessel.

29. The combination defined in claim 28, wherein the vessel comprises a bargelike vessel of the order of a few hundred feet in length, less than a 100 feet in width, wherein the ramp length is of the order of 50 feet and its width of the order of 40 feet.